United States Patent [19]

Burgdorf

[11] Patent Number: 4,767,165
[45] Date of Patent: Aug. 30, 1988

[54] SLIP-CONTROLLED BRAKE SYSTEM

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 16,227

[22] Filed: Feb. 19, 1987

[30] Foreign Application Priority Data

Feb. 19, 1986 [DE] Fed. Rep. of Germany ....... 3605220

[51] Int. Cl.⁴ .............................................. B60T 8/88
[52] U.S. Cl. ...................................... 303/92; 303/114; 60/545
[58] Field of Search .................... 60/545; 303/12, 92, 303/113, 114, 116

[56] References Cited

U.S. PATENT DOCUMENTS

| | | | |
|---|---|---|---|
| 3,999,808 | 12/1976 | Belart | 303/116 X |
| 4,072,085 | 2/1978 | Soupal | 303/114 X |
| 4,512,615 | 4/1985 | Kita et al. | 303/114 X |
| 4,555,144 | 11/1985 | Belart et al. | 303/114 X |
| 4,576,004 | 3/1986 | Bach | 303/114 X |

Primary Examiner—Duane A. Reger
Attorney, Agent, or Firm—James B. Raden; Robert P. Seitter

[57] ABSTRACT

A slip-controlled brake system for automotive vehicles comprising two static brake circuits (17, 18) into which pressure fluid can be introduced in case of control, comprising a master cylinder assembly (12) and a hydraulic booster (11), a hydraulic auxiliary-pressure supply system (2) as well as wheel sensors (S1 to S4) and electronic circuits (38) for determining the wheel rotational behavior and for generating electric braking-pressure control signals. The signals serve to control pressure-fluid inlet valves (4, 5, 6) and outlet valves (7, 8, 9) inserted into the pressure fluid lines (14, 17, 18) for the purpose of slip control. Connected upstream of the hydraulic booster (11) is a vacuum booster (1), the force-output member (51) of which is in operative engagement with the control piston (53) of the booster piston (54) of the hydraulic booster (1). The control piston (53) is coupled by way of a lever assembly (41) with the valve piston (20) which controls the pressure in the booster chamber (21), and with the booster chamber (21) communicating with the wheel brakes (HL, HR) of the rear wheels through the brake line (14).

6 Claims, 1 Drawing Sheet

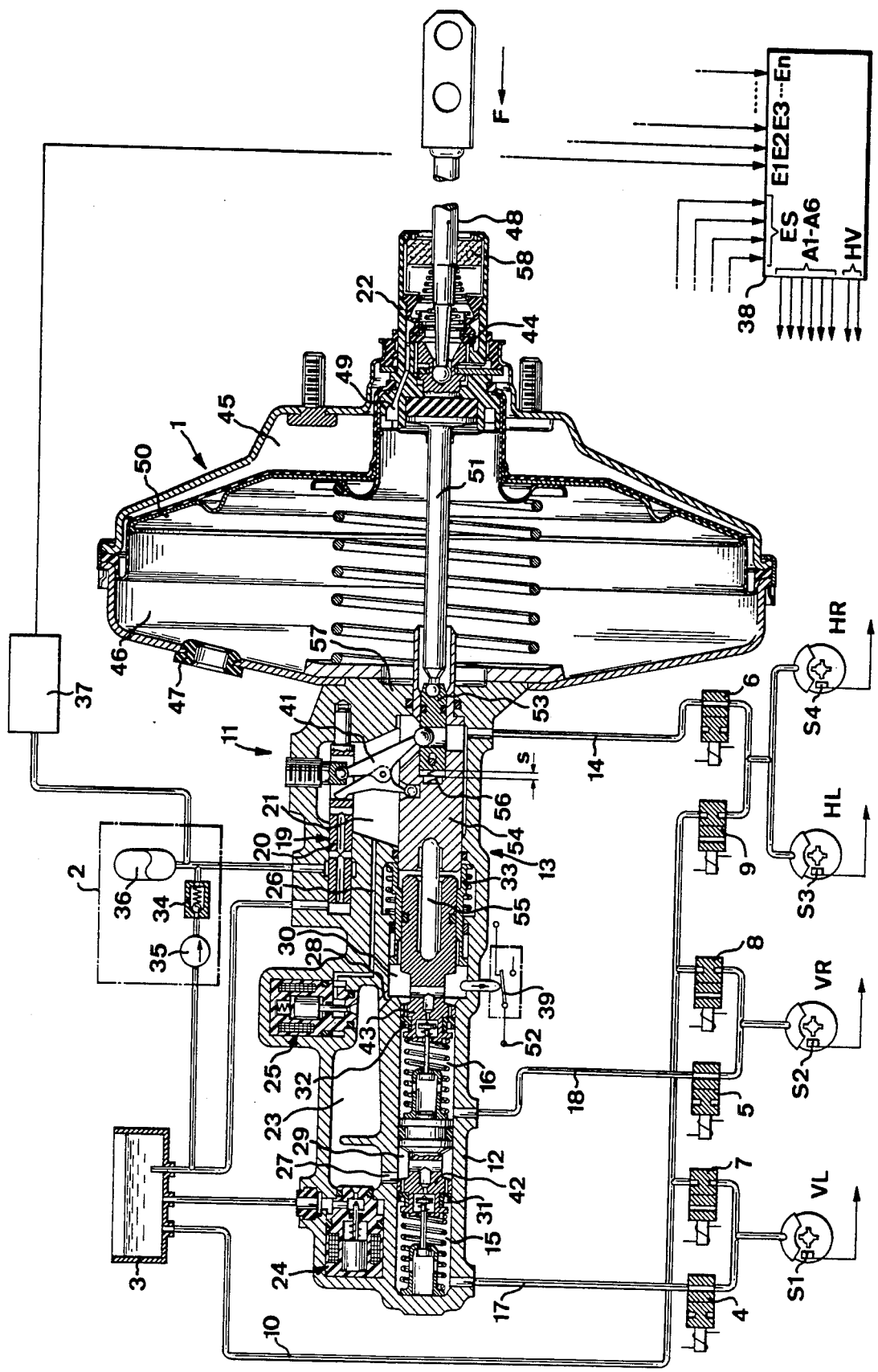

SLIP-CONTROLLED BRAKE SYSTEM

BACKGROUND OF THE INVENTION

The present invention relates to a slip-controlled brake system for automotive vehicles comprising one static brake circuit into which pressure fluid out of a dynamic pressure fluid circuit can be introduced when a control action becomes necessary. The system further includes one dynamic brake circuit with a master cylinder assembly and a hydraulic booster with a hydraulic auxiliary-pressure supply system. Wheel sensors and electronic circuits are provided for determining the wheel rotational behavior and for generating electric braking-pressure control signals which serve to control pressure-fluid inlet valves and outlet valves inserted into the pressure fluid lines for the purpose of slip control.

In vehicles with a high total weight, very great boosting forces are necessary for obtaining a comfortable pedal feeling. The dimensioning of the boosting forces is, however, subject to legislated prescriptions so that compromises with respect to a longer pedal travel must be accepted. That is, if safe braking which can be easily governed by the driver is desired upon booster failure.

It is an object of the present invention to devise a brake system of the type described which, even on failure of the hydraulic auxiliary-pressure supply system, enables safe braking with comparatively low pedal forces and a very small lost pedal travel.

SUMMARY OF THE INVENTION

This object is achieved according to the present invention wherein connected upstream of the hydraulic booster is a vacuum booster, the force-output member of which is in operative connection with the booster piston of the hydraulic booster. The force-output member of the vacuum booster is articulated at the coupling element for the valve piston, for instance at the control piston of the booster piston, so that, up on a possible failure of the hydraulic booster during a braking operation, the force-output member of the vacuum booster will move into abutment with the booster piston after the output member has overcome a small lost travel, the output member will then displace the booster piston simultaneously with the piston of the master cylinder in the actuating direction.

Advantageously, the force-output member is supported with its end close to the master cylinder on the booster piston of the hydraulic booster directly or through a control piston by the intermediary of a resilient element. The resilient element ensures that, with the brake released, the lever assembly which connects the control piston or the force-output member of the vacuum booster with the valve piston of the hydraulic booster assumes its initial position.

In a preferred embodiment, the master-cylinder-side end of the force-output member of the vacuum booster sealingly extends through the wall isolating the vacuum chamber from the booster chamber and, by way of a coupling element such as a lever assembly, is in operative engagement with the valve piston controlling the pressure in the booster chamber of the hydraulic booster. A like arrangement provides the advantage that the booster piston of the hydraulic booster is not influenced by the pressure prevailing in the vacuum chamber.

In an alternative embodiment, the master-cylinder-side end of the force-output member of the vacuum booster is held and guided in a longitudinal bore of the booster piston of the hydraulic booster and has the advantage that both boosters can be separated from each other, without permitting free access to the interior of the hydraulic booster which is extremely susceptible to dirt. Preferably, the booster chamber of the hydraulic booster communicates by way of a pressure line with any one or more of the wheel brakes, with one or more directional control valves being inserted into the pressure line.

BRIEF DESCRIPTION OF THE DRAWING

Further features, advantages and applications of this invention can be gathered from the following description with reference to the accompanying drawing wherein the single figure illustrates a brake system in accordance with the principles of the present invention.

DETAILED DESCRIPTION

In the drawing, the illustrated brake system comprises a pedal-actuated vacuum booster 1, an elongated hydraulic braking pressure generator comprising a hydraulic booster 11 and a master cylinder assembly 12, an auxiliary-pressure source 2, a supply and pressure-compensating reservoir 3 and electromagnetically actuatable two-way/two-position directional control valves 4 to 6, through which the wheel brakes, that is the front wheels and rear wheels VR, VL, HR and HL, are connected in three hydraulically isolated brake circuits. The valves 4 to 6 assume their opened position normally, that is as long as they are not excited. Further, there is provision of a return line 10 leading from the front wheels and the rear wheels VR, VL, HR, HL to the compensating reservoir 3 which line, however, is isolated from the wheel brake cylinders by means of three other two-way/two-position directional control valves 7 to 9 as long as valves 7 to 9 are not excited.

One brake circuit, namely the rear-wheel brake circuit 14, is connected directly to the hydraulic booster 11, while the two working chambers 15 and 16 of the master cylinder assembly 12, which is designed herein as a tandem master cylinder, communicate by way of separate brake circuits 17 and 18 with one front wheel VR and VL, respectively. The two master cylinder circuits of a like arrangement are referred to as static pressure-fluid circuits. In this arrangement, the rear-axle circuit is termed as a dynamic pressure-fluid circuit because in this circuit 14 the pressure is determined by the position of a control valve 19 that is actuated by the pedal by way of lever assembly 41. Depending on the displacement of a valve piston 20 the valve allows more or less pressure out of the auxiliary-energy source 2 to flow into the booster chamber 21 and from there into the brake circuit 14.

The vacuum booster 1 flanged to the housing of the hydraulic booster 11 comprises a control housing 22 which is furnished with a double or poppet valve 44, through which the outside air entering the filter 58 can be introduced into the working chamber 45. The vacuum chamber 46 is in permanent communication with a vacuum source by way of the socket 47 so that, on displacement of the actuating rod 48 in the direction of the arrow F, the poppet valve 44 opens the atmosphere inlet and simultaneously closes a vacuum channel 49. Accordingly, the pressure developed in the working chamber 45 on the right of the booster piston 50 displaces the booster piston 50 in the direction of the arrow F together with the push rod 51. The pressure built up in the booster chamber 21 of the hydraulic booster 11 and introduced through the control valve 19, respectively, simultaneously acts on the pistons 42, 43 of the master cylinder assembly 12 and leads to the build-up of braking pressure in the working chambers 15 and 16 of the two static brake circuits 17, 18 extending to the front wheels VR and VL. At first, atmospheric pressure still prevails in a prechamber 23 of the master cylinder assembly 12 because this chamber is in communication with the pressure-compensating reservoir 3 by way of a so-called main valve 24 when the latter is in its inactive position, that is, when it is not excited. Another main valve 25 is closed in its inactive position.

Each wheel VL, VR, HL, HR of the vehicle equipped with the inventive brake system is furnished with a sensor Sl to S4 which is, for example, designed as an inductive pick-up for measuring data and which feeds information about the wheel rotational behavior into an electronic controller 38. The corresponding inputs of the controller 38 are referred to by $E_S$. Among others, this controller contains electronic combining logic in the form of hard-wired or programmed circuits, such as microprocessors, and after evaluation of the sensor signals produces control commands which are applied to the outputs $A_1$ to $A_6$ and HV and are delivered further to the corresponding solenoid valves 4 to 9, 24 and 25 by way of signal lines (not shown).

Upon commencement of brake slip control, both main valves 24 and 25 are changed over. This causes opening of a pressure fluid conduit 26 leading from the booster chamber 21 into the prechamber 23 so that pressure fluid flows into the prechamber 23. This pressure propagates further through connecting channels 27, 28 to annular chambers 29, 30 within the master cylinder assembly 12. Out of these chambers, pressure flows through sleeve seals 31, 32 arranged at the periphery of the pistons 42, 43 and performing the function of non-return valves, and is introduced dynamically into the working chambers 15, 16 which are in communication with the wheel brakes of the front wheels.

The dynamically introduced pressure simultaneously results in resetting of a positioning tube 33 of the positioning device 13, as a result of which the pistons 42, 43 in the master cylinder assembly 12 assume a defined position in a known manner.

Because of the dynamic introduction of pressure fluid into the static circuits of the front wheels VR, VL and into the annular chamber 30 which is decisive for the resetting pressure exerted on the positioning tube 33, and even in the event of frequent pressure reduction by means of discharge of pressure fluid through the changed-over valves 7 and 8, the working chambers 15 and 16 undesirably becoming empty due to control is prevented.

On occurrence of a defect in the auxiliary-pressure supply system 2, which herein is composed of a pressure fluid pump 35 with the associated non-return valve 34 and a pressure fluid reservoir 36, the pressure alarm circuitry 37 will respond and report this condition to the electric controller 38 of the brake system. Depending on the magnitude of the residual pressure, this causes partial de-activated or disconnection of the brake slip control. The pressure alarm circuitry 37 is necessary anyway in the embodiment shown because the auxiliary pressure is used for the brake force boosting in the static pressure circuits 17, 18 and for the braking pressure generation in the dynamic brake circuit 14 even when normal braking without slip control is performed.

Defects in the dynamic pressure fluid conduit within the braking pressure generator, for instance a defect in the booster chamber 21 or in the line 26, a leaky main valve 24 or a main valve 25 which does not open will be detected by measuring the travel or by determining the position of the positioning tube 33. This is because if a leakage or a defect in the pressure fluid conduit prevents the delivery of dynamic pressure into the annular chamber 30, when brake slip control takes place this results in a reduction of the volume in the working chambers 15, 16. This also results in a considerable shift of the positioning tube 33 to the left, when viewed in the drawing, whereby (when the remainder of pressure fluid volume in the front-wheel circuits becomes too small) the mechanical switch 52 will be displaced, will open the signal path from the voltage source by way of a contact 39 to the terminal WU (travel monitor). This will also feed an error signal through the input $E_2$ of the electronic controller 38. Because of this, the brake system will be de-activated partially or disconnected completely by way of the indicated outputs $A_1$ to $A_6$ and HV which lead to the switching valves 4 to 9 and to the main valves 24 and 25.

Combining the measurement of the travel and, respectively, the determination of the position of the positioning tube 33 in the master cylinder assembly with other monitoring criteria, for instance with pressure monitoring, provides increased reliability of the system. That is, it creates a redundancy with respect to the detection of errors.

If the hydraulic booster 11 fails, for example, due to a defect at the pump 35 of the auxiliary-pressure source 2, the vacuum booster which operates completely independently of the hydraulic booster 11 will be available for the braking action and for boosting the pedal force, respectively. The vacuum booster is dimensioned such that the pedal force will suffice in any case to reliably brake even a particularly heavy vehicle. In a like manner (that is, failure of the hydraulic booster 11), the push rod 51 acts by way of the auxiliary piston 53 directly (after having overcome the control travel s) on the booster piston 54 which, in turn, moves the piston 43 of the master cylinder assembly 12 by way of the tappet 55 so that braking pressure develops in the working chambers 15, 16.

The combination of the wheel brakes VL, VR of the front axle of the vehicle, which brakes are pressurized by the master cylinder 12 by way of the brake circuits 17, 18 and the wheel brakes HL, HR of the rear axle which are acted upon dynamically by the hydraulic booster 11 and with a vacuum booster 1 connected upstream of the hydraulic booster 11, affords realizing optimum short pedal travels with very high boosting factors (for example V is greater than 6) while keeping within legislated regulations.

The rating of the boosting factors dictates that the vacuum booster 1 is dimensioned to be somewhat stronger than the hydraulic booster 11, in order to realize the same brake deceleration on simultaneous failure of the hydraulic booster and the brakes of the rear axle upon failure of the vacuum booster 1.

The following figures provide examples for dimensioning the boosters 1 and 11:

| V in total | V hydraulic booster | V vacuum booster |
|---|---|---|
| 4 | 1.75 | 2.3 |
| 5 | 1.95 | 2.6 |
| 6 | 2.15 | 2.8 |

Finally, it should be noted that it is another advantage that the booster characteristic curve deviates twice.

What is claimed is:

1. A slip-controlled brake system for automotive vehicles having one static brake circuit into which pressure fluid from a dynamic pressure fluid circuit can be introduced when a control action is performed, said system comprising a master cylinder assembly and a hydraulic booster (11), a hydraulic auxiliary-pressure supply system, wheel sensors and electronic circuits for determining the wheel rotational behavior and for generating electric braking-pressure control signals which serve to control pressure-fluid inlet valves and outlet valves inserted into the pressure fluid lines for the purpose of slip control, and a vacuum booster (1) connected upstream of said hydraulic booster (11), said vacuum booster (1) having a force-output member (51) which is in operative engagement with an articulated lever apparatus (41), whereby said vacuum booster (1) acts directly to generate braking pressure upon failure of said hydraulic booster.

2. A slip-controlled brake system as claimed in claim 1, wherein the force-output member (51) of the vacuum booster (1) is articulated at the coupling element for the valve piston (20), and at the control piston (53) of the booster piston (54).

3. A slip-controlled brake system as claimed in claim 1, wherein said force-output member (51) is supported at its end closest to said master cylinder assembly on said booster piston (54) of said hydraulic booster (11) through a control piston (53) by means of an intermediary resilient element (56).

4. The slip-controlled brake system as claimed in claim 1, wherein said articulated lever apparatus (41) is in operative engagement with a valve piston (20) to control the degree of fluid pressure in the booster chamber (21) of the hydraulic booster (11).

5. The slip-controlled brake system as claimed in claim 4, wherein said force-output member of said vacuum booster is held and guided in a longitudinal bore of the booster piston (54) of the hydraulic booster (11).

6. The slip-controlled brake system as claimed in claim 5, wherein said booster chamber (21) of said hydraulic booster (11) communicates by means of a pressure line (14) with one or more wheel brakes and forms a dynamic brake circuit by means of said pressure line (14).

* * * * *